United States Patent Office 3,097,048
Patented July 9, 1963

3,097,048
METHOD AND COMPOSITION FOR DYE-STRIPPING
Wilhelm E. Walles, William F. Tousignant, and Robert J. Axelson, Midland, Mich., assignors to The Dow Chemical Company, Midland, Mich., a corporation of Delaware
No Drawing. Filed Aug. 24, 1960, Ser. No. 51,487
7 Claims. (Cl. 8—102)

The invention relates to dye-stripping, more particularly, to stripping dyes from cellulosics with new and useful dye-stripping compositions comprising aqueous solutions of poly-N-vinyl-5-methyl-2-oxazolidinone (hereinafter referred to as PVO-M).

Stripping of dyestuffs from textile fibers has always presented many difficulties, including both technological and economic difficulties. Stripping may be necessitated for several reasons, such as uneven dyeing of the fiber or fabric with light and heavy shade regions, dyeing to a shade darker than intended, or, the desire or need to dye the fiber or fabric an entirely different color. With the advent and use of new dyestuffs with fast-to-boiling properties and dyestuffs of which the reduced forms have an affinity for the textile product, the problem of successful stripping has been accentuated. The problems are most prevalent in the areas of vat-type dyes on cotton and viscose rayon. Other dye classes tend to respond more easily to relatively moderate stripping conditions.

Vat dyeings on cellulosics which result in shades darker than desired may often be stripped to a small extent by a fresh bath of sodium hydroxide and sodium hydrosulfite at high temperatures. If the stripping treatment is too long, the dye which was removed may once again dye the fiber, and, although series of short treatments (each time using a fresh bath) removes more color, this is only economically feasible for small lots.

Other stripping media have shown some success. Sodium or zinc salts of sulfoxylate-formaldehyde compounds with sodium carbonate can effectively strip most vat dyestuffs. Objectionable odors are produced, however, and the stripping treatment is relatively severe so that very careful control is called for in order not to damage the fibers.

The introduction of other agents in the stripping bath have proved to be very helpful in stripping dyestuffs from cellulosics. Some of these agents are polyvinyl pyrrolidone, alkyl polyglycol ethers and certain quaternary ammonium compounds. These compounds tend, in one way or another, to keep the dye in solution and thus from recombining with the fiber once they have been stripped from the fiber. This action is not entirely understood. It may be that of a dispersing action or a result of the reduced form of the dyestuff having actual affinity for the agents, this affinity being greater than the affinity for the fiber from which the dyestuff was stripped.

With several classes of dyestuffs, particularly vats and sulfurs, it is the reduced form of the dyestuff that is usually the soluble form. Thus, in many stripping operations, it is necessary to include a reducing agent and other solubilizing agents in the stripping bath. A typical and the most commonly used dye-stripping combination for stripping vat dyes is an aqueous solution of sodium hydroxide and sodium hydrosulfite. The amounts of sodium hydroxide and sodium hydrosulfite used will generally be in the neighborhood of the concentrations used in the dyeing. That is, for a heavy shade, more dyestuff and more of the caustic soda and hydrosulfite will be required, and, in turn commensurate amounts of the caustic soda and hydrosulfite will be required to strip the dyestuff. Of course, other considerations will determine the amount of stripping agents, as for instance, the desired amount of stripping back or lightening of the shade. Frequently, it may be desirable to give the fibers a mild bleach after stripping.

In general, sulfur dyes are treated quite similar to vat dyes as far as dyeing and stripping are concerned. Direct dyes, on the other hand, dye and strip from cellulosic materials with relative ease, many being suitably water soluble to apply and strip without any solubilizing agents.

As discussed previously, the stripping of vat and sulfur dyes with a typical stripping composition leaves much to be desired. If the stripping action is maintained too long, the fibers begin to re-dye, or, splotchy deposits on the fibers may result. If deep stripping is desired, many successive operations are required if damage to the substrate is to be avoided. Even then, stripping that results in an essentially white fiber or fabric is unlikely and frequently unobtainable. With direct dyes, likewise, the fibers will begin to take-up once again the stripped dye so that successive strippings are required or large liquor to goods ratios must be used.

It is the chief aim and concern of this invention to provide new and useful dye-stripping compositions suitable for stripping a wide variety of dyestuffs from cellulosic fibers and fabrics with increased stripping efficiency and without any deleterious effects on the stripped cellulosic substrate. Additional objects and advantages of the invention will be manifest in the ensuing description and illustrations.

The dye-stripping compositions that are employed in the invention comprise PVO-M dissolved in an aqueous solvent vehicle which is capable of solubilizing the dyestuff desired to be stripped.

PVO-M is a water-soluble polymer of recent origin having been described in U.S. Patent No. 2,919,279. Poly-N-vinyl-5-methyl-2-oxazolidinone may be prepared as high polymers having molecular weights, for example, in the range from 10 to 50 thousand higher (as determinable from Fikentscher K-values of about 10 or more to as high as 75 to 100 or so), in order to provide a wide variety of polymer material than can be advantageously employed in the present compositions. Thus, PVO-M in broad molecular weight ranges up to 100,000 to 200,000 or so is quite soluble in water and can be beneficially used in formulating the dye-stripping compositions of the herein-described invention.

Highly efficient stripping can be effected when PVO-M is incorporated in the stripping bath, for instance, stripping a vat dye from cotton such as to leave the cotton essentially completely white in a single stripping operation without any fiber damage is possible when PVO-M is employed in a typical stripping bath for vat dyestuffs discussed previously.

The amount of PVO-M necessary to use in the stripping bath will, of course, depend on the intended results. Usually the stripping efficiency will increase with the amount of PVO-M employed and the upper limits of PVO-M that can be beneficially utilized would only be controlled by the solubility of the polymer in the particular stripping bath. Accordingly, stripping baths containing up to at least 20 percent of the polymer, and frequently up to as much as 50 or more weight percent of the polymeric solute, based on the weight of the resulting solutions, are capable of being used in the practice of the present invention. The exact requirements for any one stripping will depend on the particular fiber or fabric, for example, whether it be cotton or viscose rayon; the particular dyestuff employed, some being more easily stripped than others; the amount of dyestuff on the fiber; the degree of strip required; and, to some extent, the polymer molecular weight. In any event, it is a simple matter for any skilled artisan to determine the most advantageous proportioning of PVO-M in the stripping bath. Generally, an amount of polymer about equal to the amount of dye originally used to dye the fiber provides highly beneficial and efficient stripping. Thus, for a light dyeing or shade about 2–3 percent of the dyestuff based on the weight of the fiber (O.W.F.) may be used, whereas, for a heavy dyeing about 10–15 percent of the dyestuff (O.W.F.) might be used. Correspondingly then, for an essentially complete strip of the dyestuffs from the fiber 2–3 percent PVO-M (O.W.F.) would be used in the first instance and 10–15 percent PVO-M (O.W.F.) would be used in the second instance. Lesser or greater amounts may be used as the needs require. Indeed, excellent results can be obtained when only a small amount of the polymer is used, as little as a fraction of a percent (O.W.F.) PVO-M can be significantly beneficial.

If desirable, certain other agents may be added to the stripping bath to assist in efficiently emulsifying or solvating the PVO-M, particularly if higher temperatures such as temperatures near the boil are used in the stripping operation. Beneficially, the glycol ethers described in copending application Serial No. 720,355, filed March 10, 1958, now U.S. Patent No. 3,054,764, or the alkyl diphenyl ether sulfonates, described in the copending application of William W. Bakke, entitled "Applicating Solutions of Poly-N-Vinyl-5-Methyl-2-Oxazolidinone," having Serial No. 51,483, filed August 24, 1960, now U.S. Patent 3,051,676, may be employed as assistants for emulsifying or solvating agents for the PVO-M.

The PVO-M dye-stripping compositions can be used to strip vat dyes, including those more specifically referred to as anthraquinone vats, indigoid vats and indanthrene vats; sulfur dyes; and direct dyes from pure cellulosic fibers, i.e., cotton and viscose or cuprammonium rayon. Stripping may be accomplished whether the fibers were dyed according to normal procedures or slight modifications thereof, or printed. The physical characteristics of the fiber are of no importance in carrying out the invention. Raw stock, yarn, or fabric are equally well stripped. Or, the cotton or rayon may be blended with other fibers in yarn or fabric form.

By way of further exemplification, the following illustrations are given in which all percentages are by weight unless otherwise specified.

A sample of plain white cotton toweling was scoured with 1 percent on the weight of the fiber (O.W.F.) Dupanol Wa, an anionic detergent, for 15 minutes at 71° C. in a 30:1 liquor to goods bath. After scouring, the cotton was rinsed in cold water and then dyed with 12 percent (O.W.F.) Calcosol Navy Blue Paste, a vat dye (Colour Index 59810). A 30:1 liquor to goods dye bath was used containing about 30 percent sodium hydroxide (O.W.F.) and 15 percent sodium hydrosulfite (O.W.F.). The cotton was dyed at 60° C. for about 30 minutes, treated with about 1 percent acetic acid (O.W.F.) and 1.5 percent sodium dichromate (O.W.F.) at 65° C. for 30 minutes, rinsed and dried.

The dyed cotton toweling was then cut into smaller samples each of which was treated differently as described below.

I. A sample of the initial white cotton was retained for comparison.

II. A sample of the dyed cotton was retained without further treatment.

III. A sample of the dyed cotton is given a standard stripping treatment, i.e. with an aqueous bath containing about 30 percent sodium hydroxide (O.W.F.) and about 15 percent sodium hydrosulfite (O.W.F.) and treated at about 70° C. for about 40 minutes, rinsed and dried.

IV. A sample was treated the same as III excepting to add about 50 percent, based on the weight of the solution, of ethylene glycol methyl ether (2-methoxy ethanol).

V. A sample was treated the same as IV excepting to add 10 percent PVO-M (O.W.F.) having a K-value of 30.

VI. A sample was given the treatment of V twice.

VII. A sample was given the treatment of V followed by bleaching with 30 ml. of a 5 percent aqueous solution of sodium hypochlorite in 1000 ml. of water.

VIII. A sample was treated the same as IV excepting to substitute 20 percent, based on the weight of the solution, of ethylene glycol ethyl ether (2-ethoxyethanol).

IX. A sample was treated the same as VIII excepting to add 10 percent PVO-M (O.W.F.).

Visual observation readily made apparent the effectiveness of each treatment.

II, untreated, was a deep blue.

III and IV, which are about the same, exhibited some stripping but the cotton is still decidedly blue.

V was considerably ligther than III and IV, being only a light grey.

VI appeared slightly lighter than V.

VII was essentially completely stripped appearing only slightly off white.

VIII was about the same shade as IV.

IX approximated the shade of V.

In order to obtain numerical values for the color differences observed, the samples were measured in a "Color Eye" reflectometer. This instrument gives the so-called tristimulus color factors X, Y, and Z by comparing the colors optically with a standard white. A daylight lamp was used for illumination. To measure an X factor, for example, the color filter X is used. What is measured then, is the ratio of the light reflectance of the sample over the reflectance of the standard white, both measured through color filter X and observed with a photoelectric tube. A higher value means higher reflectance or ligther color (closer to white). A change of 3–5 units or so is considered a significant and visually observable difference. These results are set out in Table I.

TABLE I

*Percent Reflectance for X, Y, Z Filters in "Color Eye" Instrument*

| Sample | X | Y | Z |
| --- | --- | --- | --- |
| I | 92 | 88 | 82 |
| II | 5 | 3½ | 6 |
| III | ca. 31 | ca. 30 | ca. 44 |
| IV | 31 | 30 | 44 |
| V | 52 | 52 | 56 |
| VI | 52 | 53 | 53 |
| VII | 84 | 84 | 90 |
| VIII | 28 | 27 | 38 |
| IX | 37 | 36 | 42 |

Similar excellent results are obtained when PVO-M is added to dye-stripping baths for stripping other vat dyestuffs, or sulfur or direct dyestuffs from cotton, or from rayon.

Certain changes and modifications in the practice of the present invention can be readily entered into without departing from its intended spirit and scope. Therefore, it is to be fully understood that the invention is not to be considered as being limited or in any way restricted to or by the preferred deictic embodiments thereof which are included in the foregoing description and specification. Rather, it is to be interpreted and construed in the light of what is set forth and defined in the hereto appended claims taking into account the fact that poly-N-vinyl-4-methyl-2-oxazolidinone is generally equivalent to poly-N-vinyl-5-methyl-2-oxazolidinone and that identical results are obtained when the latter isomer is entirely or only partially replaced with the former and that both species, for present purposes, are adapted for utilization in the practice of the present invention and intended to be covered thereby.

It is also to be understood that certain copolymers of which N-vinyl-5-methyl-2-oxazolidinone (VO-M) is an essential ingredient may be employed in the practice of this invention. Illustrative of some of the monomers that may be polymerized with VO-M to form the copolymers are sodium styrene sulfonate, maleic acid salts, vinyl acetate, vinyl pyridine, acrylic acid, and other such water soluble monomers.

What is claimed is:

1. A dye-stripping composition for stripping vat, sulfur, and direct dyestuffs from a cellulosic substrate which composition comprises poly-N-vinyl-5-methyl-2-oxazolidinone dissolved in an aqueous solvent vehicle, said solvent vehicle consisting essentially of water and a minor proportion of an agent characterized by being capable of solubilizing said dyestuffs.

2. A dye-stripping composition for stripping vat and sulfur dyestuffs from a cellulosic substrate which composition consists essentially of poly-N-vinyl-5-methyl-2-oxazolidinone dissolved in an aqueous solvent vehicle, said solvent vehicle consisting essentially of water and minor proportions of sodium hydroxide and sodium hydrosulfite.

3. In the method of stripping vat, sulfur, and direct dyestuffs from a cellulosic substrate, the improvement of dissolving in the dye-stripping bath poly-N-vinyl-5-methyl-2-oxazolidinone and effecting a stripping of said dyestuff from said substrate in the presence of said poly-N-vinyl-5-methyl-2-oxazolidinone.

4. The method of claim 3 wherein said cellulosic substrate is cotton.

5. The method of claim 3 wherein said cellulosic substrate is rayon.

6. The method of claim 3 wherein the amount of said polymer in the stripping bath is weight amount about equal to the weight amount of said dyestuff on said cellulosic substrate.

7. The method of claim 3 wherein the amount of said polymer in the stripping bath is from about 1 to about 20 percent, based on the weight of said cellulosic substrate.

References Cited in the file of this patent

UNITED STATES PATENTS

| | | |
|---|---|---|
| 2,798,788 | Studer et al. | July 9, 1957 |
| 2,919,279 | Walles et al. | Dec. 29, 1959 |
| 2,948,656 | Tousignant et al. | Aug. 9, 1960 |
| 3,030,339 | Tousignant et al. | Apr. 17, 1962 |